Dec. 2, 1952          E. H. LUPTON                    2,620,002
                      PEELING MACHINE

Filed Aug. 5, 1950                                 2 SHEETS—SHEET 1

INVENTOR.
ELMER H. LUPTON

BY Howard J. Whelan
         ATTORNEY

Dec. 2, 1952 E. H. LUPTON 2,620,002
PEELING MACHINE
Filed Aug. 5, 1950 2 SHEETS—SHEET 2
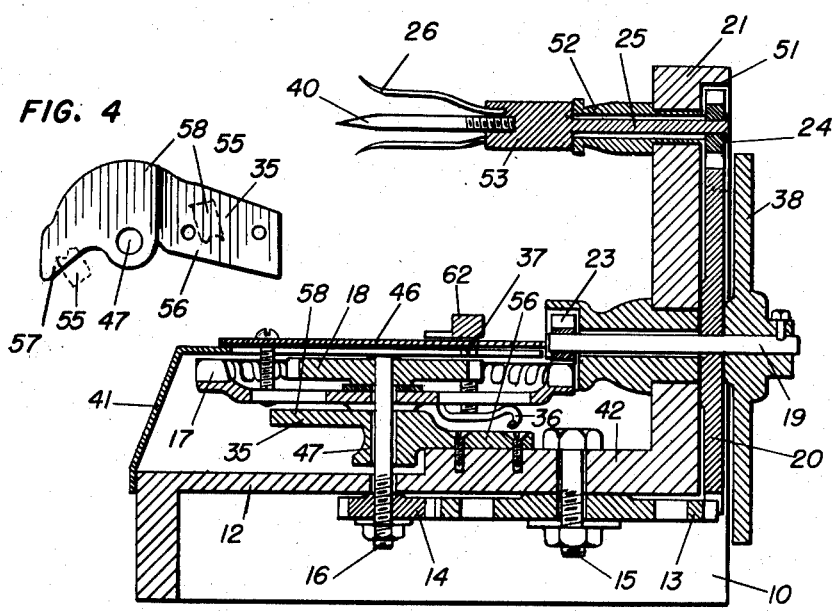
FIG. 4
FIG. 3
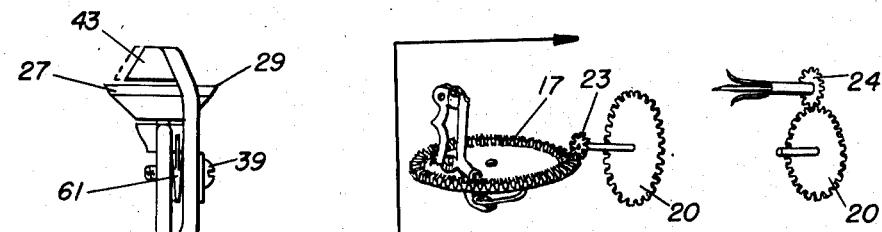
FIG. 5
FIG. 8
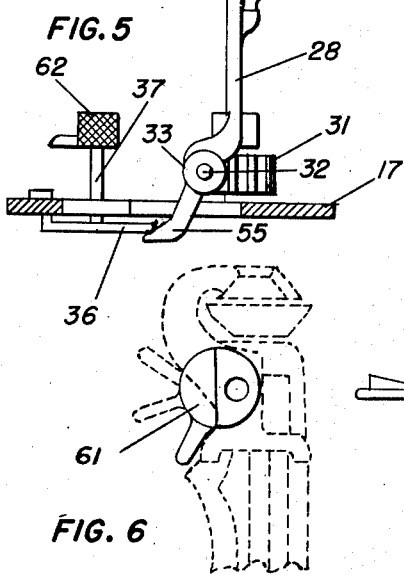
FIG. 6
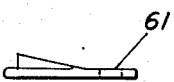
FIG. 7
INVENTOR.
ELMER H. LUPTON
BY Howard J. Whelan
ATTORNEY Patented Dec. 2, 1952

2,620,002

UNITED STATES PATENT OFFICE 2,620,002

PEELING MACHINE

Elmer H. Lupton, Baltimore, Md., assignor to The Sinclair-Scott Company of Baltimore City, a corporation of Maryland Application August 5, 1950, Serial No. 177,840

2 Claims. (Cl. 146—43)

This invention relates to kitchen equipment and more particularly to paring machines for removing the outer skin of vegetables, fruits and the like.

This invention is an improvement of parers such as is described in U. S. Patent 331,451 and has for its object to make it a more effective device, safer to use and of more attractive appearance. Another object of the invention is to provide a new and improved vegetable or fruit peeler or parer that will be compact, easy to keep clean and sanitary and capable of being manufactured economically. A further object of the invention is to provide a new and improved vegetable or fruit parer that will be portable and with its mechanism covered so the user will be protected from injury. An additional object of the invention is to provide a new and improved vegetable or fruit parer that can be adjusted to suit various thicknesses of skin, to be removed by it.

Other objects of the invention will become apparent as it is more fully described.

For a more comprehensive understanding of the invention and the objects thereof, reference is made to the accompanying drawings, which in conjunction with the following description illustrate a particular form of the invention, by way of example, while the claims emphasize the scope thereof.

Referring to the drawings:

Figure 3 is a sectional view taken on line 3—3 of Figure 1;

Figure 4 is a plan view of the cam used to bring the cutter in and out of contact with the product being peeled;

Figure 5 is a typical side sectional view of the cutter and yoke;

Figure 6 is a plan view of the guard adjuster;

Figure 7 is an edge view of the guard adjuster shown in Fig. 6; and

Figure 8 is a diagrammatic view showing the movement of the various elements used to operate the device in predetermined sequence.

Similar reference characters refer to the same parts throughout the drawings.

Figure 1:
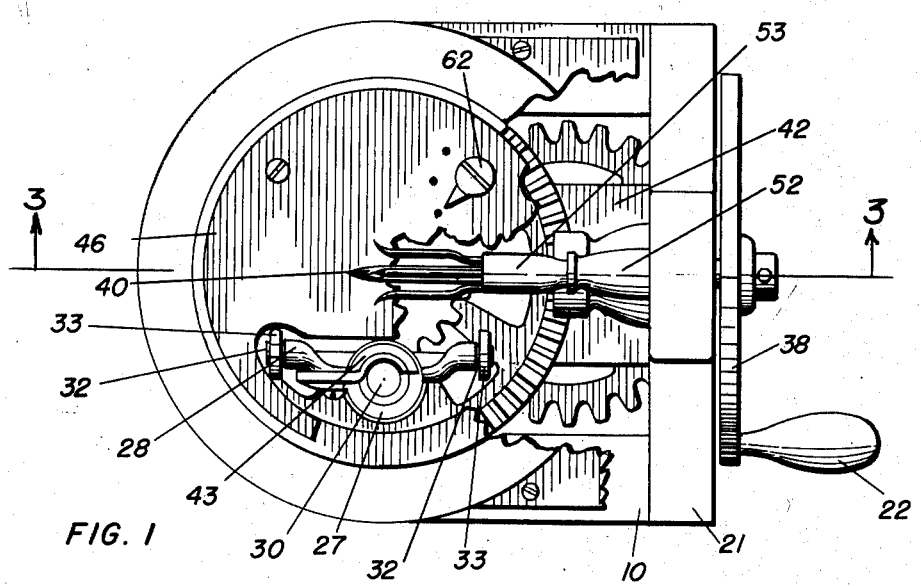
Figure 1 is a plan view of a peeling machine embodying this invention, with parts broken away to show its inner construction.
Figure 2:
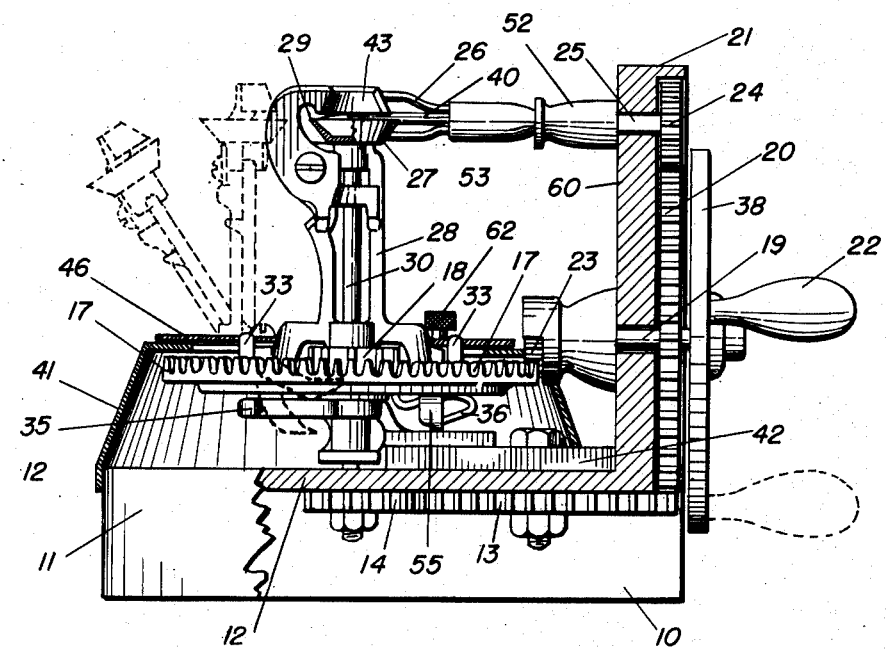
Figure 2 is a side elevation of Figure 1, with parts broken away to show its inner construction.

The drawings indicate a parer intended for peeling an apple or similar vegetable item. It consists of a housing or framework 10, which serves to support the mechanism of the device and forms a stable support suitable for use on a table or other flat surface. The framework 10 is of L-form with the base portion 11 of open box-like form covered by a flat horizontal shelf 12 on which the mechanism under the device is supported. This mechanism comprises a pair of meshing spur gears 13 and 14 located under the shelf 12. The gear 13 is the driver and is preferably larger than the gear 14. A bolt 15 holds the gear 13 to the shelf 12 and allows it to rotate thereon in a horizontal plane. A vertical shaft 16 attached to the gear 14 passes through the shelf 12 and cam 35 and is supported thereby and acts as a guide for a large gear 17 which rotates freely thereon, while the end of the shaft 16 is tightly attached to a small spur gear 18. The gears 17 and 18 are adjacent each other, one above the other, and rotate independently of each other and in opposite directions. A crown gear 20 positioned in a vertical plane, meshes at right angles with the teeth of gear 13 and rotates it as the gear 20 is turned with its horizontal shaft 19 which is journalled in the upright wall 21 of the framework 10. A bracket 42 extends at right angles from the wall 21 and is a part thereof. The crown gear 20 is fitted in a recess 51 in the wall 21 out of contact with the user and is rotated through the use of a handle 22 mounted on a flywheel 38. The horizontal shaft 19 extends inwardly through the wall 21 and has a gear 23 attached to its end to mesh with the teeth of the large gear 17 which it rotates as the handle is turned. The crown gear 20 is meshed with a smaller gear 24 which also operates in the recess 51 and drives a stub shaft 25 to which it is attached. The stub shaft 25 is supported in a bearing 52 in the wall 21 and extends rearwardly and is enlarged at 53 to support a triple armed fork or trident which it rotates. The vegetable to be peeled is placed on the fork or trident and rotated so it will be aligned with a cutter 27 supported in an oscillating yoke 28. The cutter 27 is of a bevelled or frustrum cone shape with a rotatable circular cutting edge 29 operating in a horizontal plane. The cutter 27 is formed so it can be held on a shaft 30 journalled in the yoke 28. The cutter 27 is rotated through the shaft 30 and gear 31 which meshes with the spur gear 18. The yoke 28 has a pair of laterally extending arms 32 that journal in bearings 33 affixed to the upper face of the large gear 17. When the yoke 28 oscillates on its arms 32 through a relatively short travel, it tilts the attached gear 31, but not enough to interfere with the regular meshing of its teeth with those of gear 18 so it will continue to cooperatively function therewith, in all its positions. The gear 17 carries the yoke 28 around with it in its bearings 33. The yoke 28 is provided with an arm 55 that contacts at predetermined periods of its rotation various surfaces of the cam 35 and moves the yoke and cutter towards or away from the product being peeled in a predetermined manner. This induces the yoke with its cutter to swing through a predetermined angle or arc. The cam 35 is shown fastened to the bracket 42 so it will operate the yoke as described. The cam 35, itself consists of a single element with a hole 47 to enable the shaft 16 to be slid through it. The peripheral contours of the cam (see Fig. 4) enable the cam to be turned around the shaft to take up various positions and vary the movement of the yoke and rotating knife to suit the shapes of different vegetables or products to be peeled on the device. The purpose of oscillating the yoke while it is rotating is to enable the spinning cutter 27 to approach the product to be peeled at the part nearest the forks and work down towards the opposite end and as it approaches center, to move the cutter away from the product until the cutter is returned to the starting point. The peeled product is then removed and replaced with another to be peeled. Figure 4 shows the cam 35 used to control the movement of the yoke and cutter during the operation of the device. When the arm 55 attached to the yoke moves into the starting position it is gliding over the depressed surface 56 of the cam which keeps the cutter from contacting the face 60 of the wall 21 and holds it in that position until the arm 55 drops off the end 54 which is the starting point for peeling. A spring 36 attached at one end to the underside of the gear 17 has its opposite end bearing against the arm 55 and holds the cutter in peeling position. When the arm 55 contacts the tripper edge 57 the yoke and cutter are moved away from the center of the gear 17 and out of peeling contact until the arm reaches the depressed flat surface 56 where the cycle starts over again. The spring is preferably as shown and provided so its tension can be adjusted through the use of a screw 37 threaded to fit into a tapped hole in the gear 17 and passing down against the spring 36 to increase or decrease the tension of the arm 55 and yoke and cutter 27. The flywheel 38 helps the device to run smoother and also covers the gear 20. The operation of the device is performed by placing the product to be peeled on the forks 26 when the cutter is back towards face 60 of the wall 21. The handle 22 is then turned clockwise and rotates gears 20 and 24 and trident 26 and the product to be peeled with it. As the arm 55 leaves the depressed surface 56 the cutter through the tension of spring 36 is drawn against the surface to be peeled and it continues peeling until the arm 55 reaches the tripper edge 57 of the cam and moves the cutter out of cutting position until it reaches the starting position where the peeled product is removed and a new one placed on the fork.

The gear 20 at the same time also rotates the gears 13 and 14, shaft 16 and gears 18 and 31 to turn the cutter 27. The horizontal shaft 19 with its gear 23 meshes with the large gear 17 which carries the yoke and cutter with it and during its rotation removes the peel from the product during one-half its revolution and the cutter is then returned to its starting point as explained above. The movement of the cutter is progressively around the vegetable or product rotated by the trident so as to reach all of the skin to be removed. The cutting depth of the cutter 27 is made adjustable by the operation of a screw 39 in the yoke 28 which is loosened or tightened to suit the position of the wedge 61 which controls the depth of the cut to be made in removing the skin or the depth of the cut to be made when making shoe string potatoes. The adjustment of the wedge varies the position of a movable guard 43 in relation to the cutting edge 29 of the cutter 27 and controls the depth of the cut to be used during the peeling operation. The cutter in the form shown has the advantage of removing the skin or peel in one continuous strip.

The spike 40 is removably attached to the trident 26 and is used for soft bodied vegetables or fruits to prevent their breaking during the skinning or peeling operation. The spike is removed when peeling peaches or any product having a hard center.

The frame 10 is also provided with a covering 41 and plate 46 to cover and protect the mechanism and prevent the user from injury. The covering 41 is formed as indicated to suit the arrangement of the parts and mechanism. It is frustumatical in contour and can be slipped in and out of position readily and held therein by screws or other attaching means. The plate 46 is also attached to the gear 17 and rotates with the yoke, it is provided with markings to show the depth of the cut to be made and has a hole through which the screw 37 projects to receive a knurled pointer head 62.

While but one general form of the invention is shown in the drawings and described in the specifications it is not desired to limit this application for patent to this particular form, as it is appreciated that other forms could be made that would use the same principles and come within the scope of the appended claims.

Having thus described the invention, what is claimed is:

1. A machine for removing the skin of vegetables, fruits and the like, comprising a frame, a rotatable holder for the article to be skinned, said holder having a central spike and outer flexible fingers to secure the article to the holder, a rotatable cutter of truncated-cone shape having its base upwardly arranged and its smaller dimension downwardly of the base, and also having its cutting edge at the base, associated means carried by the frame for rotating said holder and cutter and including a flywheel, means for oscillating the cutter during its rotation so as to periodically engage the cutter with the article for skinning thereof and to discontinue such engagement, said last named means including a yoke, and wedge means carried by said yoke for adjusting the cutter position and varying the thickness of the skinning of the article.

2. A machine as set forth in claim 1 including a guard for the cutter adjustable thereover by the aforestated wedge means.

ELMER H. LUPTON.

REFERENCES CITED

The following references are of record in the file of this patent:

UNITED STATES PATENTS

| Number | Name | Date |
| --- | --- | --- |
| 122,305 | Batchelder | Jan. 2, 1872 |
| 325,903 | Bittenbender | Sept. 8, 1885 |
| 331,451 | Scott | Dec. 1, 1885 |
| 340,037 | Cottrell | Apr. 27, 1886 |
| 846,765 | Vogel | Mar. 12, 1907 |
| 1,956,492 | China | Apr. 24, 1934 |